US009600830B2

(12) United States Patent
Alsina et al.

(10) Patent No.: US 9,600,830 B2
(45) Date of Patent: Mar. 21, 2017

(54) SOCIAL REFERRALS OF PROMOTIONAL CONTENT

(71) Applicant: Apple Inc., Cupertino, CA (US)

(72) Inventors: Thomas Alsina, Mountain View, CA (US); David T. Wilson, Campbell, CA (US); George R. Dicker, Sunnyvale, CA (US); Subash Sundaresan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 14/291,885

(22) Filed: May 30, 2014

(65) Prior Publication Data

US 2015/0348078 A1 Dec. 3, 2015

(51) Int. Cl.
*G06F 17/30* (2006.01)
*G06Q 30/02* (2012.01)
*G06Q 50/00* (2012.01)

(52) U.S. Cl.
CPC ... *G06Q 30/0214* (2013.01); *G06F 17/30867* (2013.01); *G06Q 30/0204* (2013.01); *G06Q 50/01* (2013.01)

(58) Field of Classification Search
CPC ............ G06Q 30/0214; G06Q 30/0204; G06F 17/30864
See application file for complete search history.

(56) References Cited

U.S. PATENT DOCUMENTS

| 2005/0125287 | A1* | 6/2005 | Sureka | G06Q 30/02 705/14.16 |
| 2006/0212355 | A1* | 9/2006 | Teague | G06Q 30/02 705/14.16 |
| 2010/0076849 | A1* | 3/2010 | Bishop | G06Q 30/02 705/14.64 |
| 2011/0196725 | A1* | 8/2011 | Malcolmson | G06Q 30/0214 705/14.16 |
| 2014/0129324 | A1* | 5/2014 | Spivack | G06Q 30/0269 705/14.45 |
| 2014/0337134 | A1* | 11/2014 | Bugenhagen | G06Q 10/087 705/14.57 |
| 2015/0019310 | A1* | 1/2015 | Young | G06Q 30/0223 705/14.16 |

* cited by examiner

*Primary Examiner* — Anil Bhargava
(74) *Attorney, Agent, or Firm* — Polsinelli LLP

(57) ABSTRACT

Methods and arrangements allow merchants to set up advertising campaigns that distribute special offers or discounts and allows users to forward the special offers to friends. The forwarding of the offers could expose merchants to offering more discounts than budgeted and this is a concern. The invention addresses this by having the forwarded offer check with the merchant server or advertising server to see if there is enough budget in the campaign left to allow the issuance of the forwarded offer, and if so, the server issues a new identifier. If not, the user receiving the forwarded offer receives a message saying the campaign has expired. Since every offer has its own identifier, the forwarding of the offers can be tracked, as well as the redemption, which allows for social metric collection.

21 Claims, 4 Drawing Sheets

SOCIAL REFERRALS OF PROMOTIONAL CONTENT

TECHNICAL FIELD

The present technology pertains to electronically distributed promotional content, and more specifically pertains to the facilitation of referrals of promotional content to user networks.

BACKGROUND

Within traditional advertising campaigns for goods and services, coupons and similar promotional content are often used as an effective way to get potential customers interested. They attract customers toward the content provider due to a discount on a particular product or service, with the end result being a sale and potentially future sales. The customer may also spread word about the ongoing promotional campaign to family and friends within his network, causing buzz or word of mouth sales to organically occur. In some promotional campaigns, this customer can receive further discounts or incentives for referring people within his network.

The potential for sharing and referrals has been much greater since online social networks and social applications have gained prominence. Whereas traditional print campaigns often had a limited scope of referrals and word of mouth, social media ad campaigns can have a vast reach in a short span of time. Individuals who are major social influencers can vastly impact the spread of the promotional content.

However, there is limited ability for promoters to control promotional campaigns that rely on referrals and social sharing.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a promotional content referral system. Content providers who wish to promote products and services via discounts, coupons, and other promotions can submit promotional content materials to a promotional content system, which generates the promotional content and sends it to targeted users selected by a server. In some embodiments, promotional content can take the form of a "pass" or coupon within a digital collection application such as digital passbook system. A digital collection application allows a broad set of promotional content and other pieces of content from various providers to be stored within a user device, and shared with other users on other user devices. Promotional content can be shared in the form of a URL, pass, text message, application, or other content that can be engaged with on a user device.

Once promotional content is generated and sent to a target user device, then a user operating the user device can engage with that promotional content, convert to a purchase (digitally or by presenting the promotional content in a physical retail outlet), etc. The user can also opt to refer the promotional content to one or more friends, family members, or contacts within the user device. The user can also share the promotional content on social networks on a one-on-one basis. Rather than spamming to a large set of people, a user typically shares only with a user's contacts though to be interested in the promotion. In some embodiments a user or device is limited to narrowly targeting one person or a small group of persons. This facilitates controlled sharing, and leads to better social responses and higher conversion rates. A referral can be sent via email, text, a shared URL, a shared pass in a digital collection application, or other means of sharing with another user on a second user device.

The user on the second user device can then opt to engage with the referral, and a message is sent from the second user device to the content provider. At this point, the content provider can choose whether to generate a piece of referred promotional content or not. If the content provider is over budget on the promotional campaign, then it may opt to not generate and send this content. Otherwise, referred promotional is generated and sent to the second user device. Referred promotional content is substantially the same as original promotional content, which means that it results from the same promotional campaign and may include the same promotional materials that from the basis of the campaign. However, it can include some differences from the original promotional content such as featuring a different discount, containing a different identifier, or even have a different appearance, etc. Once the referred promotional content is sent, it can be engaged with by the second user. The second user can convert the discount into a purchase (digitally or by presenting the promotional content in a physical retail outlet), share the content with another recipient, and so on.

A record of the referral is stored within the promotional content system, containing the identifiers for both the original promotional content and the referred promotional content, information about the first and second users, and more. In some embodiments, a social graph can be constructed which describes the social links and referral chain for the promotional campaign, as well as information about who the major referrers and social influencers are for the campaign. In some embodiments, a content provider can send queries to the content promotional system about the aggregate demographics of referrers, those who convert purchases, those who engage with the content, and more.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an improved, efficient method of facilitating referrals for a promotional advertising campaign. The disclosed technology provides users with a way to share content in a controlled, focused fashion. It also provides users with a way for referred content to be converted independently from the original content. The disclosed technology also provides advertisers with insight into the referral chains and aggregate demographics of users in that chain, and allows advertisers to control the spending on and distribution of promotional content while the material is spreading across networks.

Figure 1:
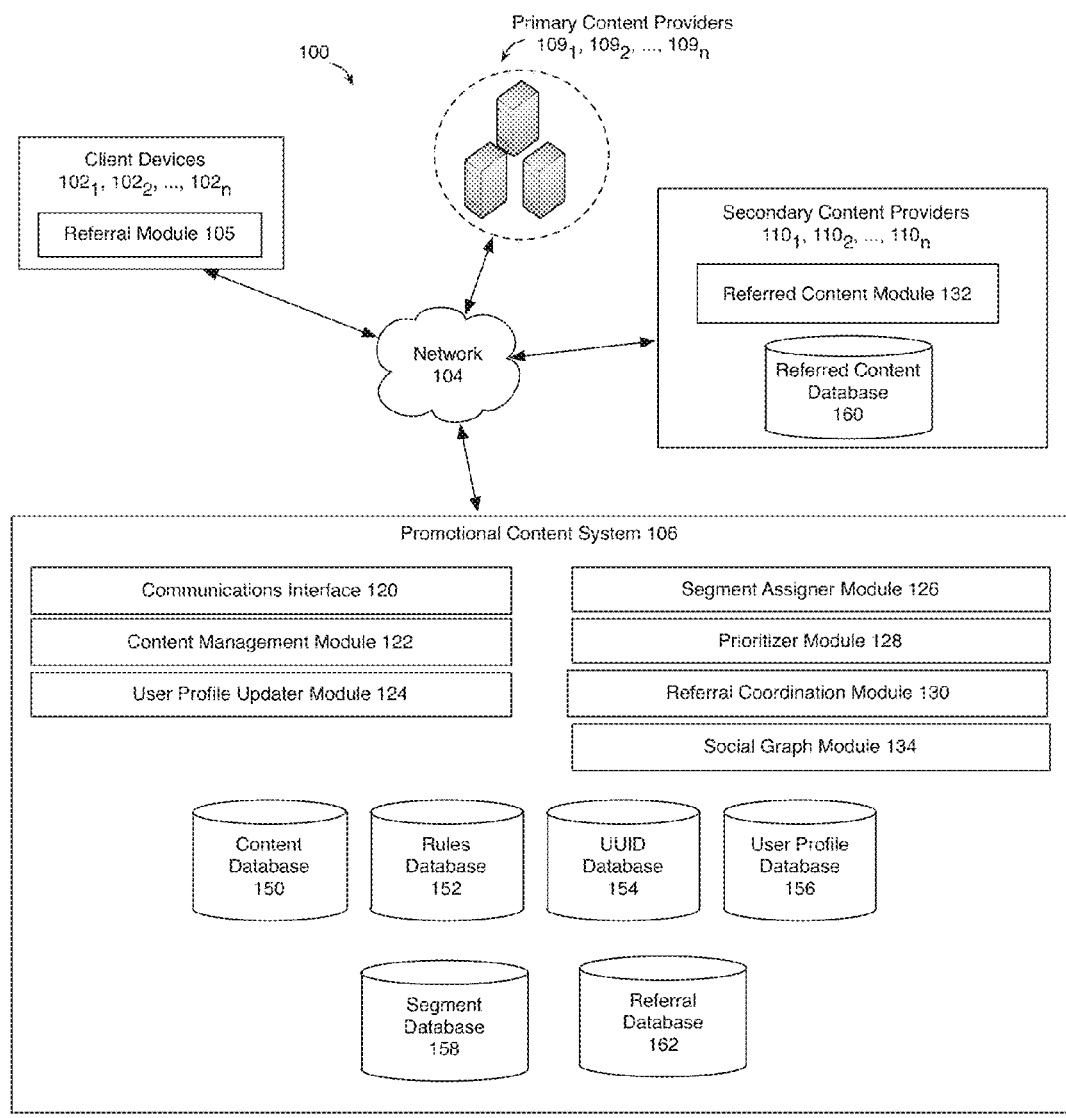
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, promotional content can be delivered to user terminals $102_1$, $102_2$, . . . , $102_n$ (collectively "102") connected to a network 104 by direct and/or indirect communications with a promotional content system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, promotional content system 106 can concurrently accept connections from and interact with multiple user terminals 102.

The promotional content system 106 can receive a request for electronic content, such as a web page, an application, a media item, etc., from one of user terminals 102. Thereafter, the promotional content system 106 can assemble a content package and transmit the assembled content page to the requesting one of user terminals 102. To facilitate communications with the user terminals 102 and/or any other device or component, the promotional content system 106 can include a communications interface 120.

The promotional content system 106 can include a content management module 122 to facilitate the generation of an assembled content package. Specifically, the content management module 122 can combine content from one or more primary content providers $109_1$, $109_2$, . . . , $109_n$ (collectively "109") and content from one or more secondary content providers $110_1$, $110_2$, . . . $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. In the case of an application being the primary content, the application can be delivered to one of the user terminals and stored on the user terminal at some time prior to requesting promotional content. For the promotional content provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the promotional content system 106. In some embodiments, the promotional content system 106 can preselect the content package before a request is received.

An assembled content package can include text, graphics, audio, video, executable code, or any combination thereof. Further, an assembled content package can include promotional content designed to inform or elicit a pre-defined response from the user. In some embodiments, the promotional content can be associated with a product or can directly or indirectly advertise a product. For example, the assembled content package can include one or more types of advertisements from one or more advertisers.

Additionally, the promotional content can be active promotional content. That is, promotional content that is designed to primarily elicit a pre-defined response from a user. For example, active promotional content can include one or more types of advertisements configured to be clicked upon, solicit information, or be converted by the user into a further action, such as a purchase or a download of the advertised item. However, promotional content can also be passive promotional content. That is promotional content that is designed to primarily inform the user, such as a video. In some cases, passive promotional content can include information that can lead or direct users to other promotional content including active promotional content.

Furthermore, the promotional content can be dynamic promotional content. That is promotional content that varies over time or that varies based on user interaction. For example, dynamic promotional content can include an interactive game. However, the various embodiments are not limited in this regard and the promotional content can include static promotional content that neither varies over time nor with user interaction. In the various embodiments, promotional content in a content package can be static or dynamic and active or passive. A content package can include a combination of various types of promotional content in a single content package.

Promotional content can also contain information about discounts in the form of monetary values or percentages, and number of referrals that have been made. Discount information can be specific to an individual user, and can dynamically change according to a number of parameters. Promotional content can include a combination of dynamic discount information, static discount information, and other forms of content.

Each promotional content item contains an identifier for the content. An identifier is a unique ID number that corresponds to the promotional content item, and uniquely identifies it from other pieces of promotional content within the promotional content system 106. The promotional content identifier can be included as metadata within the promotional content item, can be listed within a separate list or database associating identifiers with promotional content, can be part of the information within the content database 150 or the referred content database 160, or otherwise be associated with the promotional content.

Promotional content can be ingested into a system (hereinafter referred to as a "digital collection application") that allows a broad set of promotional content and other pieces of content from various providers to be stored within a user device 102 and shared with other users on other user devices. An example of such a system is the Passbook functionality within the iOS operating system, from Apple, Inc. of Cupertino, Calif. Digital collection applications such as Passbook from Apple, Inc. allow for content to be ingested from a wide variety of sources. Examples of content can include airline boarding passes, movie tickets, coupons, and gift cards. The content is converted into "passes" that can include barcode content that is easily scanned with barcode scanners, thus converting the content into purchases, verified flight check-ins, etc. The passes can be shared with family and friends via email, text messages, and other forms of communication. The passes can also be associated with a user account, user information and purchase history, and more.

In some cases, a content package can replace or update promotional content in a content package already delivered to a user terminal. For example, a first content package can include an app that can be installed on the user terminal $102_i$. A subsequent content package can include one or more items of promotional content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the promotional content system 106 and improve overall user experience. That is, the promotional content system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the promotional content system 106 assembles the content package from multiple content providers, the assembly rules can be stored in a rules database 152 in the promotional content system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including promotional content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, promotional content can be selected based on the characteristics of the requesting user (s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of promotional content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the promotional content system 106 can be configured to learn of or derive user characteristics from any number of other information sources. For example, in some configurations, the promotional content system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the promotional content system 106 can also include a unique user identifier (UUID) database 154 that can be used for managing sessions with the various user terminal devices 102. The UUID database 154 can be used with a variety of session management techniques. For example, the promotional content system 106 can implement an HTTP cookie or any other conventional session management method (e.g., IP address tracking, URL query strings, hidden form fields, window name tracking, authentication methods, and local shared objects) for user terminals 102 connected to promotional content system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The promotional content system 106 can analyze the attributes of requesting devices to determine whether such requests can be attributed to the same device. Such attributes can include device or group-specific attributes.

In some embodiments, the promotional content system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the promotional content system 106 can receive a direct request to update one or more user profiles. The update request can come directly from the user's device or any other device capable of communicating with the promotional content system 106, such as other content delivery networks or websites. In some cases, the promotional content system 106 can receive an indirect request to update one or more user profiles. An indirect request can be the result of receiving new user characteristic values. An update request can occur at any time.

In some embodiments, the promotional content system 106 can include a segment database 158 that is used to aid in selecting promotional content to target to users. The segment database 158 can store defined segments and associations between the segments and users and/or promotional content that should be targeted to users associated with the segments. As described above, a targeted segment can be defined based on one or more user characteristics or derivatives thereof and can be associated with one or more items of promotional content. Additionally, a targeted segment can be associated with one or more users. In some embodiments, by associating a targeted segment with both a user and an item of promotional content, the delivery system can match promotional content with users. In some embodiments, the promotional content system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the promotional content system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the promotional content system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the promotional content system 106.

In some embodiments, the promotional content system 106 can provide a prioritizer module 128. The prioritizer module 128 can perform a variety of prioritizing tasks based on the configuration of the promotional content system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the promotional content system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

The user devices 102 can include a referral module 105. The referral module 105 allows for promotional content to be referred from one user device with a first user to a second user device with a second user. Referral messages are generated by the referral module 105 (e.g., on user device $102_1$) and can contain a unique presentation based on the user referring, the format of the referral (e.g., email, text message, social network post, etc.), and the promotional content being shared. Referrals can consist of a user sharing promotional content or referring users to promotional content via a digital collection application, URL, application, or share functionality built into the promotional content. Users to send referrals to can be selected from, e.g. a phone contacts list, a social network "friends" or "followers" list, message participants, etc. A user can also be selected freely if the user is not within any existing contact list. A referral message is intrinsically associated with the user and user device 102 that sent the referral. Such data can appear in metadata associated with the referral message, or in a separate piece of information that can be communicated between a content provider 110, user device 102 and promotional content system 106.

Once a first user device $102_1$ sends a referral to a second user device $102_2$, the user of the second user device $102_2$ can opt to engage with the referral or ignore it. If the user ignores the referral, nothing will happen with respect to the promotional content system 106. If the referral is time-sensitive, then the discounts or promotions within may eventually expire, or the promotional content itself may be automatically removed from the second user device $102_2$. If the user engages with the referral, such as clicking on a link or agreeing to an offer within the promotional content, such that the second user device $102_2$ attempts to download the referred promotional offer then a message is sent from the second user device $102_2$ to the content provider 110, informing the content provider 110 that a request for a referred promotional content item has been sent from the user device 102. The content provider 110 can determine that the promotional campaign related to the referred promotional offer is still on going and send the promotional offer having a unique identifier to the second user device $102_2$, or the content provider 110 can determine that the promotional campaign has terminated and inform the second user device $102_2$.

In some embodiments, the message can be sent to promotional content system 106, and promotional content system can determine if the promotional offer having a unique identifier can be sent to the second user device $102_2$.

As used herein a "referred promotional content item" is a content item that results from a referral. The referral that results in a referred promotional content item can come from either an original promotional content item, or another referred promotional content item. Any number of referred promotional content items can exist, indicating a chain of referrals that lead to referred promotional content items.

Regardless of whether the content provider 110 or the promotional content system 106 determines if the promotional offer can be sent to the user device, a referral coordination module 130 receives information about referrals and stores the information of the first user device $102_1$ and the identifier of the promotional content along with the information about the information related to the second user device $102_2$ and the identifier of the referred promotional content, and stores this data in a referral database 162. The referral database 162 contains all information about users who have referred promotional content from a content provider 110, along with information about the referral message and promotional content involved.

The promotional content system 106 contains a referred content module 132. Once a referral is sent to a user via the referral module 105, and the user engages with the referral as described above, then the request for a referred promotional content item is received by the referred content module 132. The referred content module 132 determines the specifics of a new, referred promotional content item that is substantially the same as an original promotional content item. A referred promotional content item being "substantially the same" as an original promotional content item means that the referred promotional content item is part of the same promotion, discount or campaign. It may have identical or substantially similar promotional content. The identifier is different and unique, however, indicating that this is a different piece of content than the original promotional content item. In addition, the amount of a discount may be different for the referred promotional content item than the amount of the discount for the original promotional content item or the referred promotional content item can even have a different appearance, etc. The targeting specifics of the content may be different as well, if the promotional content system 106 or content provider 110 detects that a different demographic target is the recipient of the referred promotional content item.

Once the referred content module 132 determines the specifics of the referred promotional content item, it can be generated and then sent to the second user device $102_2$. Generation of the referred promotional content can be accomplished solely by the referred content module 132, or generation can occur in conjunction with the content management module 122, first user device $102_1$, second user device $102_2$, or any combination thereof. In some embodiments, the promotional content system 106 can include a referred content database 160 for locally storing/caching referred promotional content items that are generated and maintained by content providers 109 and 110. The data in the content database 160 can be refreshed or updated on a regular basis to ensure that the referred content in the database 160 is up to date at the time of a request from a user terminal $102_i$. However, in some cases, the referred content module 132 can be configured to retrieve content directly from content providers 109 and 110 if the metadata associated with the data in the content database 160 appears to be outdated or corrupted.

The referred promotional content item can contain options for being ingested into a digital collection application, just as an original promotional content item. It can also include buttons and options for sharing and referrals. In this way, referred promotional content can continue to be referred in a chain of referrals from one user device to the next.

In some embodiments, the referred promotional content item can be in the form of a wrapper pass. In such embodiments, rather than a URL being shared, a wrapper pass is shared that looks like the original promotional content item, but contains blank data fields. In some embodiments, the blank data fields are not visible or are metadata to the pass. Neither the referrer nor the recipient need to be aware that there is any difference between the original promotional content item and the referred promotional content item.

After the wrapper pass is received on the second user device, the wrapper pass can contact content provider 110 (in some embodiment promotional content system 106) to determine if the promotional campaign is still active such that the wrapper pass can actually be issued, and to retrieve at least a unique identifier. In some embodiments, additional information is downloaded as visual or non-visual data to complete the wrapper pass and make it a redeemable promotional content item. The wrapper pass can work within the system as a new piece of referred promotional content, and exist along the sharing chain in the same way as any other piece of referred promotional content does. In some embodiments, the user device can convert the wrapper pass into a regular pass by assigning a unique identifier to it. No connection with the promotional content system 106 is necessary for such a conversion.

The promotional content system 106 can contain a social graph module 134. The social graph module 134 receives referral information from the referral database 162. Such referral information includes, for example, the unique identifier associated with a referred promotional content item, the unique identifier associated with an original promotional content item, the user ID associated with the referrer, the user ID associated with the user who received the referral, and so on. The social graph module 134 can also receive information relating to the demographics, purchase history, and other pieces of information relating to a user. The social graph module 134 then constructs a social graph, containing the full extent of the chain from original promotional content up to the various branching referrals leading to different pieces of referred promotional content. Such a chain can potentially be very large and contain many branching referrals. The social graph displays information about referrals in a clear way, and allows the promotional content system 106 to identify the major social influencers with respect to referrals. The social graph can also contain information about the promotional content involved, and how it differs as the chain of referrals advances.

In some embodiments, in addition to the social graph maintained by the promotional content system 106, the content provider 110 may also construct its own social graph. As described above, in some embodiments the content provider 110 is contacted by each item of referred content, determines whether the campaign is still active, and issues a unique identifier for referred content. In such embodiments, the content provider can create a graph of referrals based on the identify of the referring content item and the assigned referred content. While the social graph generated includes the full chain of branching referrals and associated identifiers, it might not contain individual demographic information about any one referrer or link in the chain as the content provider might not have knowledge of information regarding the underlying users. The content provider 110 can only learn demographic information directly from a user, if the user supplies it to the content provider (for example, as part of the process of determining if the campaign is still active, the content provider could include additional requirements for inclusion in the campaign, such as membership to a loyalty program. In such embodiments, the content provider can require a user enter a loyalty number or sign up for the loyalty program before being given the promotional content item. The social graph of the content provider thus maintains privacy with respect to the personal information and demographics of individual users.

In some embodiments the promotional content system 106 and content providers 110 limit the information shared between the two entities in order to protect user's privacy. In such embodiments data may be shared that is necessary for the present technology to work, such as promotional content identifiers, but specific user information is not shared. However, in some embodiments generalized data about aggregate users participating in the campaign can be shared.

Once the social graph is generated by the social graph module 134, the social graph can be sent to the primary content provider 109 and secondary content provider 110. The content providers 109 and 110 can review and utilize the social graph to determine discounts, rewards for social influencers, and approaches for future promotional campaigns. Content providers 109 and 110 can also query the social graph module 134 for information about the demographic makeup of the users who have referred promotional content. In the exemplary embodiment, demographic information about individual users is not shared with content providers, as concerns about privacy require a shield between the information about users within a promotional content system and content providers within the promotional content system. However, aggregate data about demographics can be shared, which can provide insight into how future campaigns should be targeted and directed toward potential users.

While the promotional content system 106 is presented with specific components, it should be understood by one skilled in the art, that the architectural configuration of system 106 is simply one possible configuration and that other configurations with more or less components are also possible. For example, promotional content generation and referred promotional content generation can occur within the promotional content system 106, the user devices 102, the content providers 109 and 110, or any combination thereof. Once a content provider sends to the promotional content system 106 a piece of promotional content that forms the basis for the discounts and campaign, then the dynamic aspects of that promotional content can be generated elsewhere, including on user devices 102. In addition, a configuration in which the referral system works directly from user device to user device with minimal generation or processing within a promotional content system is possible, within a peer-to-peer network or similar ad hoc network.

As described above, one aspect of the present technology is the gathering and use of data available from various sources to improve the delivery to users of promotional content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Figure 2:
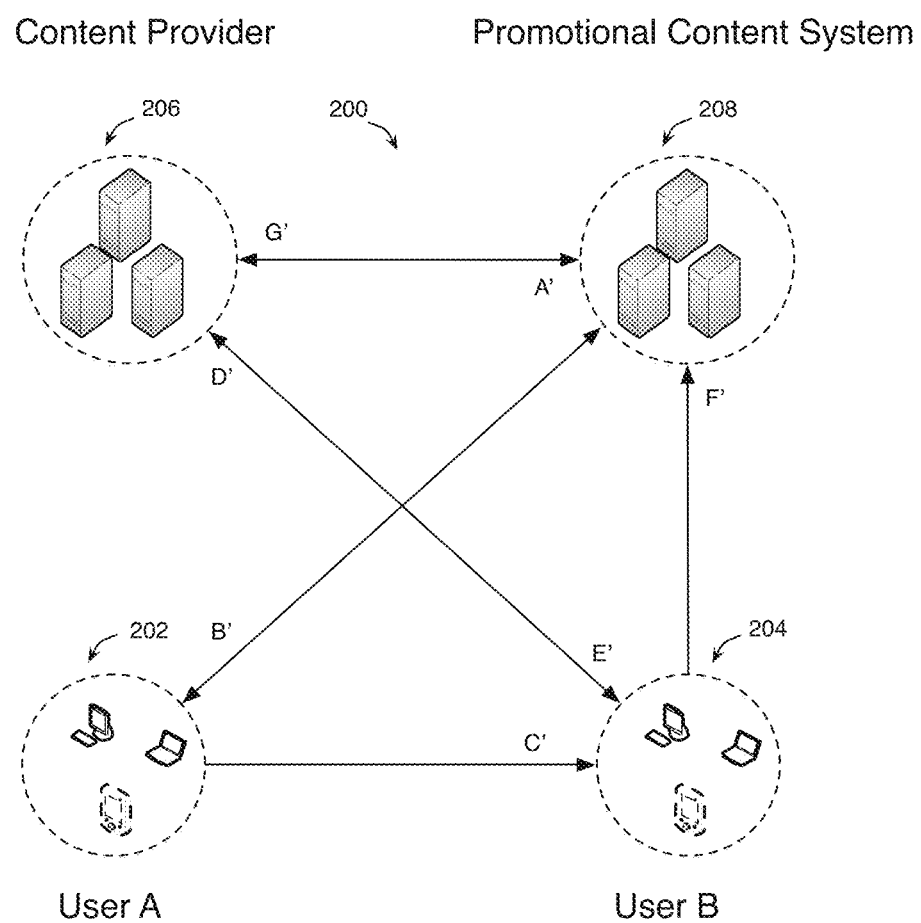
FIG. 2 illustrates an exemplary configuration of a promotional content referral system.

Turning now to FIG. 2, an embodiment of the promotional content referral process is discussed in greater detail. FIG. 2 illustrates an exemplary embodiment 200 for generating referred promotional content and facilitating referrals between users. For ease of illustration, the exemplary method 200 will be described with respect to a server-centric configuration. That is, an embodiment in which a server generates promotional content and facilitates referrals. However, the embodiment of FIG. 2 can be carried out in a substantially similar way in embodiments where some or all of the modules for generating promotional content and facilitating referrals are contained within a user device or content provider, as described above.

FIG. 2 illustrates a configuration and process of the referral system consisting of a content provider 206, a promotional content system 208, a user device A 202, and a user device B 204. Each component can communicate and transfer content via a network, as described with respect to FIG. 1. The arrows within the configuration, marked as A'-G', illustrate a likely path and transfer of information through the referral system that a single referral of promotional content can take.

At arrow A', a content provider 206 submits a promotional content campaign to a promotional content system 208. As an example that will be used throughout FIG. 2, a clothing retailer submits promotional content consisting of a 10% discount on all clothing within the company's online catalog and online store. The content provider 206 sends files and content to the promotional content system 208, which assembles a content package relating to the original promotional content. A unique identifier is associated with the original promotional content, and the package is assembled in a way that is compatible with a digital collection application within user device A 202 and user device B 204. That is, the package can be seen as a "pass" to be ingested within the digital collection application, to be viewed by the user, shared with the user's contacts, and converted into a discounted purchase of the content provider's clothing.

Arrow B' denotes that this original promotional content gets sent to the user device A 202. The user of the user device A 202 can be notified via push alert, a link to a URL within an email, by an advertisement displayed in primary content, or other forms of notification. The user can view the original promotional content, engage with the content, and share the content with others. Arrow C' denotes that the user of user device A 202 has shared or referred the content to a user of user device B 204. The referral message can take the form of a URL, wrapper pass, shared pass information, etc.

At arrow D', if the user chooses to engage with the referral link or shared content, then the user device B sends a signal to the content provider 206, indicating that the user device B is requesting referred promotional content. The request contains information including the unique identifier of the original promotional content, and the ID of the user device A 202 which acted as the referrer. At arrow E', the content provider has generated the referred promotional content in conjunction with the promotional content system 208. The referred promotional content can contain an identifier different from the identifier of the original promotional content. It can also contain different discount information and other information which differs from the original content. The content provider sends the referred promotional content to the requesting user device B 204, where the user can engage with the content.

User device B 204 accepts the referred promotional content and alerts the promotional content system 208 of the receipt of the promotional content and the unique identifier of the promotional content. This is denoted by arrow F'. The promotional content system 208 receives the user device B user ID, the identifier of the referred promotional content, and demographic and other information about the user of user device B.

The promotional content system 208 then generates a social graph or updates an existing social graph related to the promotional content. The referrer, user device A 202, is added or updated within the social graph, and the link between the referrer and the recipient, user device B 204, is created. Once the social graph reflects the new information regarding the referral and the conversion of the discount, then the promotional content system 208 sends the social graph to the content provider 206, denoted by arrow G'. The content provider 206 can then view the social graph (or a redacted version for privacy reasons) and use it to make updates to the promotional content campaign, or strategic choices regarding future campaigns.

If the referred promotional content furthermore rewards the user of user device B for passing a referral on to another user device, then this can be reflected within the content provider 206 or promotional content system 208. The process discussed above can therefore repeat again for another iteration of a referral, and so on.

Figure 3:
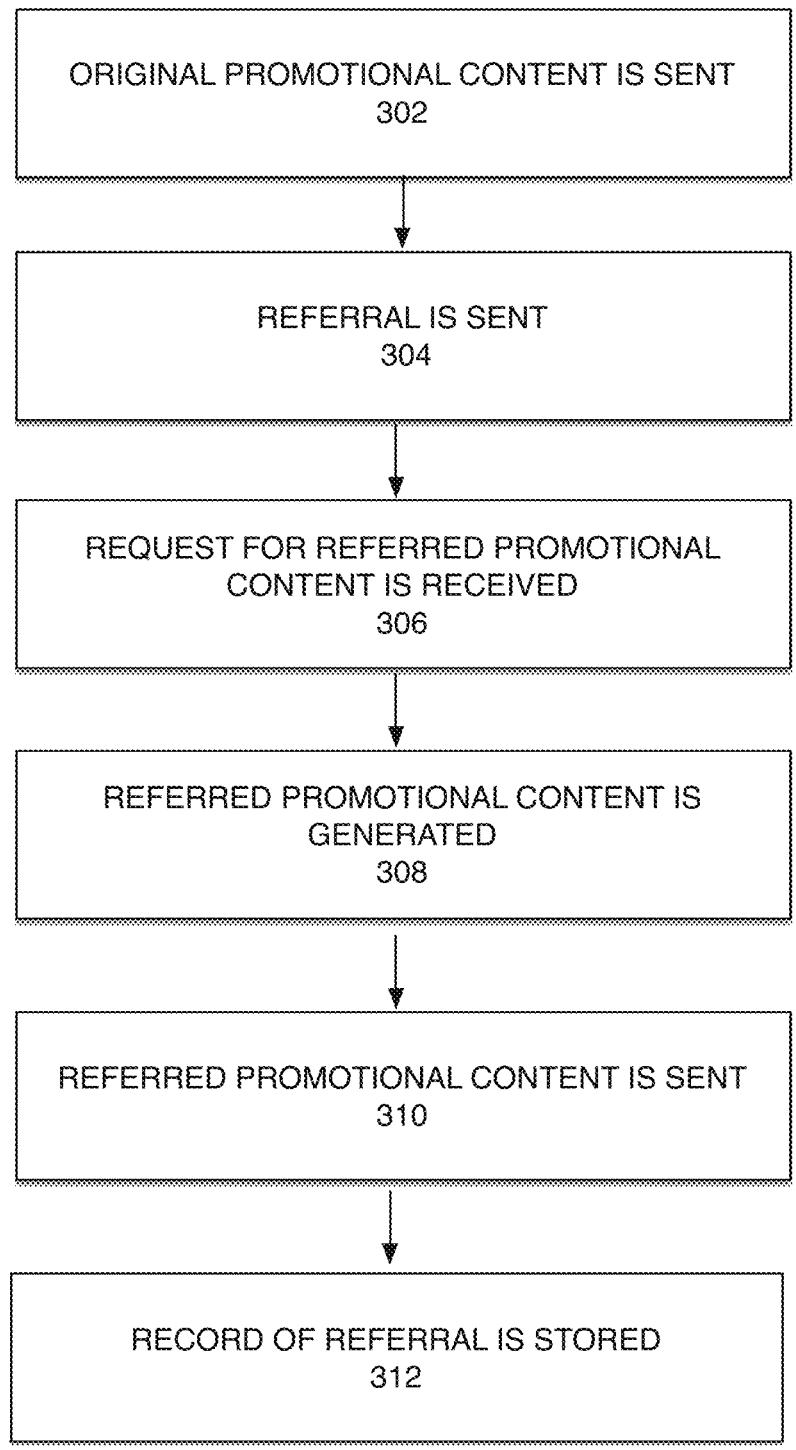
FIG. 3 illustrates an exemplary method embodiment of promotional content generation and referral.

Turning now to FIG. 3, an operation of the generation and referral process will be discussed in greater detail. FIG. 3 is a flowchart of steps for generating a referral and a referred promotional content item.

The flowchart begins at step 302, where original promotional content is sent to a first user device. Original promotional content can be any content that is part of a content provider's promotional materials, can be converted into a purchase, and can be shared with others. The promotional content can take the form of text, audio, video, a website, executable code, or any other form of content that can be engaged with on a user device. In some embodiments, the promotional content can be ingested into a digital collection application, with the promotional content taking the form of a "pass" that can be viewed on a passbook application, converted into a purchase, and shared with others at a user's request.

At step 304, the user navigating the first user device shares the original promotional content with a second user device. This is known as a "referral." The referral can be effected through clicking on a "share" button in a user interface, sharing a URL with contacts on the user device 102 or a social network, or other means of distributing the referral to others.

At step 306, the referral is received by the second user device 102. A user can choose to engage with the referral by clicking on the URL or otherwise expressing interest in the referral. Once the user engages with the referral, then a request for referred promotional content is sent to the content provider 110 and/or content system 106.

At step 308, the referred promotional content is generated by the content provider 110 in conjunction with the content promotional system 106. The generation is done in response to the user engaging with the referral. The referred promotional content is substantially the same as the original promotional content, but some aspects may differ, including a unique identifier, a different discount amount or percentage, different rewards associated with referral, or different text for the content. The referred promotional content material is part of the same promotional campaign from the content provider, and is defined as such. The redemption of the referred promotional content is tracked as a separate conversion than the redemption of the original promotional content. Therefore, a first user can convert the original promotional content, which expires, but the referred promotional content will stay unexpired until a conversion occurs within that content separately.

At step 310, the referred promotional content is sent to the second user device 102. A user can engage with the promotional content via a passbook application, browser, or other form of engaging with content on the user device, in substantially the same methods that are available for engaging with original promotional content. In some embodiments, the referred promotional content is sent only when a sufficient amount of budget remains in a promotion budget. A content provider 110 has discretion to choose whether the second user device can receive a coupon or promotional discount. In some cases, the promotional campaign may run over budget due to too many conversions or another reason, and the content provider 110 can elect to no longer send referred promotional content to users.

Finally at step 312, a record of the referral is stored within the promotional content system 106. This record of the referral consists of, for example, the first identifier of the original promotional content, the second identifier of the referred promotional content, information about the first and second users, information about the first and second user devices, and more. The record of the referral can be used to create or update a social graph, as described above. The record can also be used as the basis for answering queries from content providers who wish to learn about aggregate demographic information of those receiving advertisements. For example, content providers can learn which demographic is most likely to refer, which demographic is the most likely to convert, which demographic is most likely to view the content, and more.

Figure 4A:
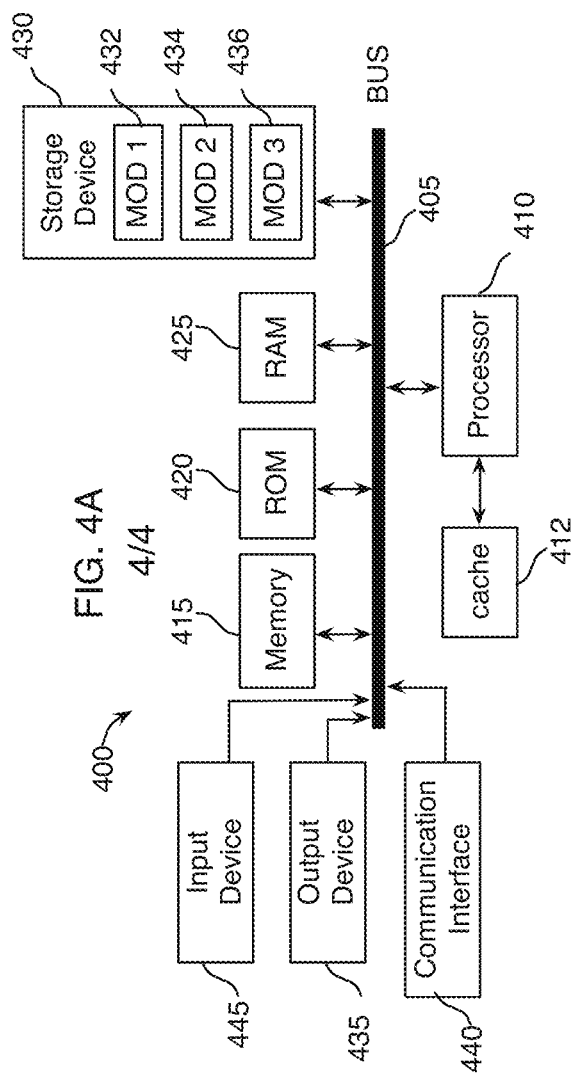
FIG. 4A and FIG. 4B illustrate exemplary system embodiments.
Figure 4B:
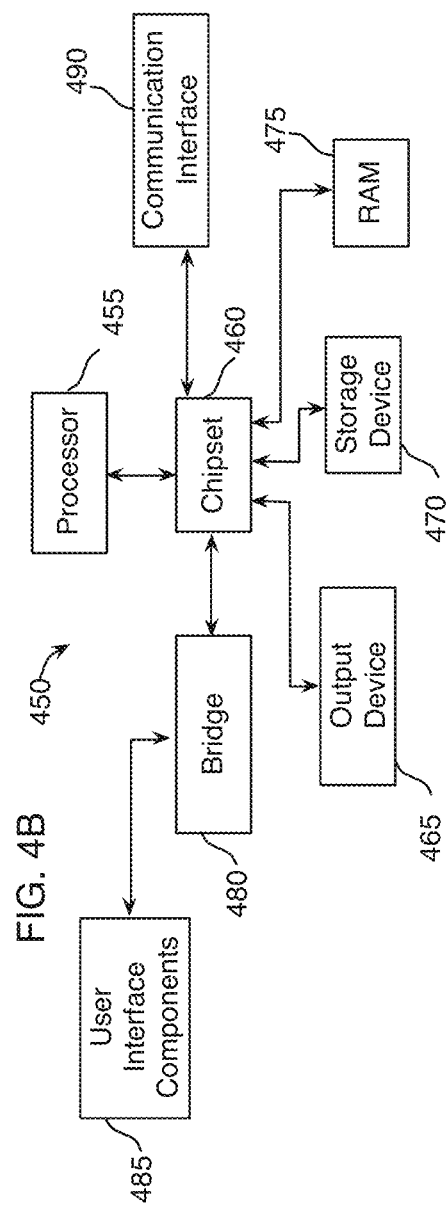

FIG. 4A, and FIG. 4B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical communication with each other using a bus 405. Exemplary system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output.

There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates a computer system 450 having a chipset architecture that can be used in executing the described method and generating and displaying a graphical user interface (GUI). Computer system 450 is an example of computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. In this example, chipset 460 outputs information to output 465, such as a display, and can read and write information to storage device 470, which can include magnetic media, and solid state media, for example. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that exemplary systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer implemented method comprising:
receiving, by a server from a content provider, a promotional content campaign;
based on the promotional content campaign, assembling, by the server, a content package having an original promotional content item, the original promotional content item being associated with a first identifier;
sending, by the server to a first client device, the content package having the promotional content item;
receiving, by the server from one or more second client devices, a message indicating that the one or more second client devices received, based on a reference from the first client device, a respective referred promotional content item comprising a respective modified version of the original promotional content item, the respective referred promotional content item comprising a respective second identifier associated with the first identifier;

generating one or more referral associations between client devices based on at least one of the first identifier and the respective second identifier;

storing, by the server, a record of one or more referral associations between client devices;

based on the record of the one or more referral associations between client devices, generating one or more indicia describing a referral chain between the first client device and the one or more second client devices and a respective modification of the original promotional content item throughout the referral chain; and modifying the promotional content campaign based on the one or more indicia describing the referral chain and the respective modification of the original promotional content item throughout the referral chain.

2. The computer implemented method of claim 1, further comprising:

determining, by the server, that the respective referred promotional content item can be sent
when a sufficient amount of budget remains in a promotion budget associated with the promotional content campaign.

3. The computer implemented method of claim 1, further comprising:

receiving, by the server, a redemption request comprising an identifier of a promotional content uniquely identifying one of the original promotional content item or the respective referred promotional content item.

4. The computer implemented method of claim 1, further comprising receiving a request made by a graphical user interface wrapper for the respective referred promotional content item, the request requesting data unique to the respective referred promotional content item.

5. The computer implemented method of claim 1, wherein the respective modification of the original promotional content item throughout the referral chain refers to how the original promotional content item was modified each respective time it was delivered or referred throughout the referral chain.

6. The computer implemented method of claim 1, further comprising:

querying, by the server, for demographic information pertaining to users that have downloaded the original promotional content item or respective referred promotional content item.

7. The computer implemented method of claim 1, wherein the one or more indicia comprises a social graph describing the referral chain between the first client device and the one or more second client devices and the respective modification of the original promotional content item throughout the referral chain.

8. The computer implemented method of claim 1, wherein the referral chain is associated with the first client device and a plurality of other client devices.

9. The computer implemented method of claim 1, wherein the one or more indicia further identifies social links between users associated with the one or more second client devices.

10. The computer implemented method of claim 1, wherein the respective referred promotional content item differs from the original promotional content item in at least one of an appearance or a promotional offer.

11. The computer implemented method of claim 1, wherein the server is a merchant's server or an advertising server.

12. A system comprising:
one or more processors;
a non-transitory computer readable medium; and
computer readable instructions, stored on the computer readable medium, that when executed are effective to cause the one or more processors:
based on a promotional content campaign, assemble a content package having an original promotional content item, the original promotional content item having a first identifier;
determine that one or more client devices received, based on a reference from a first client device, a respective referred promotional content item comprising a respective modified version of the original promotional content item, the respective referred promotional content item comprising a respective second identifier associated with the first identifier;
generate one or more referral associations between client devices based on at least one of the first identifier and the respective second identifier;
store a record of the one or more referral associations between client devices;
based on the record of the one or more referral associations between client devices, generate one or more indicia describing a referral chain between the first client device and the one or more client devices and a respective modification of the original promotional content item throughout the referral chain; and
modifying the promotional content campaign based on the one or more indicia describing the referral chain and the respective modification of the original promotional content item throughout the referral chain.

13. The system of claim 12, wherein the non-transitory computer readable medium stores additional computer readable instructions which, when executed, are effective to cause the one or more processors to:
determine an amount of budget remaining in a promotion budget associated with the promotional content campaign; and
based on the amount of budget, determining whether the respective referred promotional content item can be sent.

14. The system of claim 12, wherein the non-transitory computer readable medium stores additional computer readable instructions which, when executed, are effective to cause the one or more processors to:
receive a redemption request including a identifier of a promotional content uniquely identifying one of the original promotional content item or the respective referred promotional content item.

15. The system of claim 12, wherein the one or more client devices are a plurality of client devices, and wherein the referral chain includes the first device and the plurality of client devices.

16. The system of claim 12, wherein the non-transitory computer readable medium stores additional computer readable instructions which, when executed, are effective to cause the one or more processors to:
query for demographic information pertaining to users that have downloaded the original promotional content item or the respective referred promotional content item.

17. A non-transitory computer-readable storage medium comprising:

instructions stored in the non-transitory computer-readable storage medium, wherein the instructions, when executed by one or more computing devices, cause the one or more computing devices to:
- assemble, based on a promotional content campaign, a content package having an original promotional content item having a first identifier;
- determine that one or more client devices received, based on an indication from a first client device, a respective referred promotional content item comprising a respective modified version of the original promotional content item, the respective referred promotional content item comprising a respective second identifier;
- generate one or more referral associations between client devices based on at least one of the first identifier and the respective second identifier;
- store a record of the one or more referral associations between client devices;
- based on the record of the one or more referral associations between client devices, generate one or more indicia describing a referral chain between the first client device and the one or more client devices and a respective modification of the original promotional content item throughout the referral chain; and
- modifying the promotional content campaign based on the one or more indicia describing the referral chain and the respective modification of the original promotional content item throughout the referral chain.

18. The non-transitory computer-readable storage medium of claim 17, wherein the referral chain is associated with the first client device and a plurality of other client devices.

19. The non-transitory computer-readable storage medium of claim 17, wherein the respective modification of the original promotional content item throughout the referral chain refers to how the original promotional content item was modified each respective time it was delivered or referred throughout the referral chain.

20. The non-transitory computer-readable storage medium system of claim 19, wherein the respective referred promotional content item differs from the original promotional content item in at least one of an appearance or a promotional offer.

21. The non-transitory computer-readable storage medium of claim 19, storing additional computer readable instructions which, when executed, are effective to cause the one or more processors to:
- determine an amount of budget remaining in a promotion budget associated with the promotional content campaign;
- based on the amount of budget remaining, determine whether a respective cost delivering the respective referred promotional content item is greater than the amount of budget remaining; and
- determine, based on whether the respective cost is greater than the amount of budget remaining, whether the respective referred promotional content item can be delivered.

* * * * *